Jan. 23, 1934.  W. S. SALISBURY  1,944,195
LOCKING SEAL FOR VEHICLE LICENSE PLATES
Filed Feb. 15, 1933
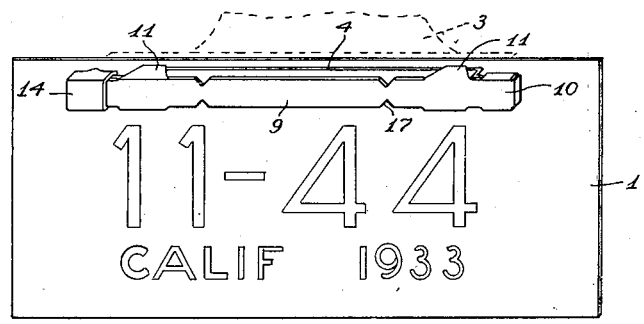
Fig. 1.
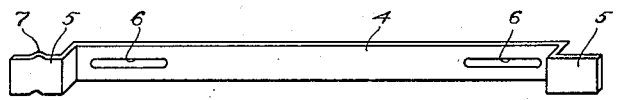
Fig. 2.
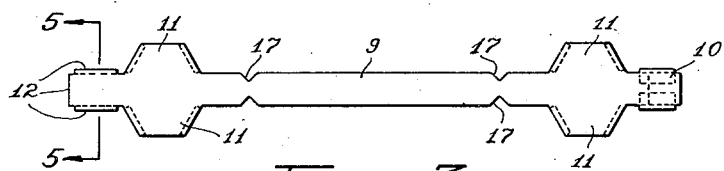 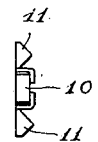
Fig. 3.  Fig. 4.
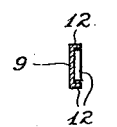 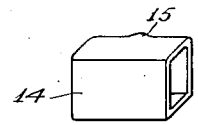
Fig. 5.  Fig. 6.
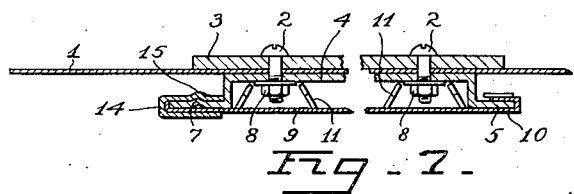
Fig. 7.
INVENTOR.
WILLIAM S. SALISBURY
BY
ATTORNEY Patented Jan. 23, 1934

1,944,195

UNITED STATES PATENT OFFICE 1,944,195

LOCKING SEAL FOR VEHICLE LICENSE PLATES

William S. Salisbury, San Francisco, Calif.

Application February 15, 1933. Serial No. 656,829

6 Claims. (Cl. 40—125)

This invention relates particularly to a metal member to cover the point of connection of the bolts holding a vehicle license plate onto a vehicle, to prevent removal of the plate without mutilating or breaking the seal member.

An object of the invention is to provide a breakable sealing member to be placed over the bolts which hold a license plate onto a vehicle, which sealing member would be broken in order to remove the plate from the vehicle, or it might be broken by legal authorities not satisfied with the claim to ownership of the vehicle by the person in control thereof, or the seal might be broken accidentally, requiring the vehicle driver to obtain a new seal from a proper source, whereby the reason for the accidental breaking of the original seal could be recorded.

A further object of the invention is to provide a protective seal for the bolts which secure a license plate to a vehicle that will be superior in point of simplicity, inexpensiveness of construction, positiveness of operation, and facility and convenience in use and general efficiency.

In this specification and the annexed drawing, the invention is illustrated in the form considered to be the best, but it is to be understood that the invention is not limited to such form, because it may be embodied in other forms; and it is also to be understood that in and by the claims following the description, it is desired to cover the invention in whatsoever form it may be embodied.

In the accompanying one sheet of drawing:

Fig. 1 represents a front perspective view of an automobile license plate having a sealing means thereon constructed in accordance with my invention.

Fig. 2 is a perspective view of the bar onto which the sealing member is secured.

Fig. 3 is a plan view of the sealing member showing the bolt enclosing portion thereof, flattened out.

Fig. 4 is an end view of Fig. 3.

Fig. 5 is a section taken through Fig. 3, on the line 5—5.

Fig. 6 is an enlarged perspective view of the cap which holds one end of the sealing member onto the bar.

Fig. 7 is a longitudinal section taken through the sealing member in the operative position, to show the relation thereof to the plate holding bolts.

In detail the construction illustrated in the drawing comprises a vehicle license plate generally designated by the numeral 1, which is adapted to be secured by the spaced bolts 2, to a bracket 3 which is securely fixed on a vehicle.

In order to secure or bolt the sealing apparatus onto the plate, I provide an elongated bar 4 having its opposite ends 5 outstanding from the plane of the bar 4, said bar 4 and the ends 5 forming a U-shaped member. The bar is provided with slots 6 adjacent each of its opposite ends, through which the ends of the bolts 2 pass, to enable said bar 4 to be used in instances where distances between the bolts 2 may vary. The outstanding shoulder 5, at one end of the bar 4 is provided with an embossment or shoulder 7 thereon, which projects toward the underside of the bar, while the other outstanding shoulder 5 may or may not be provided with a similar embossment.

The bar 4 is secured onto the outer face of the license plate by passing the ends of the bolts 2 through the slots in said bar, and then screwing on the nuts 8. The nuts 8 will thus be positioned on the exposed outer face of the bar 4.

An elongated sealing member 9 is adapted to have its opposite ends attached to the outstanding shoulders 5 on the bar 4, whereby the portion of the member 9 between the shoulders 5 is unsupported. The sealing member 9 consists of an elongated strip of metal, one end 10 of said strip having portions of the end thereof folded upon itself to form a pocket which is adapted to be slipped over one of the outstanding shoulders 5.

Flanges 11 are provided on each of the opposite sides of the strip 9 adjacent opposite ends thereof, which flanges have the corners thereof bent inwardly, and the flanges proper are adapted to be bent at right angles to the plane of the strip 9, and to overlie and enclose the heads of the bolts 2, or the nuts therein. The flanges 11 encase the nuts 8 from the sides thereof, and a portion of the strip 9 lies over the ends of the nuts, thereby forming an enclosure which prevents a wrench or other similar tool from being engaged with the nuts in order to remove them from the bolts. The metal material out of which the strip 9 is formed, is of a relatively heavy gage, and yet it is brittle so that it will break in the event any attempt is made to twist or deform any portion of the member from its preformed shape.

The other end of the member 9 is provided with flanges 12 on the sides and end thereof, which snugly engage the sides and end of the outer outstanding shoulder 5. This latter end of the member 9 is engaged by and held in contact with the outstanding shoulder 5 on the bar 4 by a rectangular closure or casing 14, which is open at one end thereof to slip over the end of the member 4 and the outstanding shoulder 5 on the bar 4.

The underside of the cap 14 is provided with an embossment 15 thereon, which is adapted to lock over the abutment 7 provided on the shoulder 5, whereby the cap 14 assumes a fixed and immovable position. While I have shown coengaging embossments 7 and 15 on the shoulder 5, and on the cap 14 to effect a locking relationship between said parts, it is to be understood that other forms of locking mechanisms might be substituted in lieu thereof.

The central portion of the sealing member 9 is provided with notched out portions 17 thereon, adjacent each of the flanges 9, to enable a portion of the member 9 between the notches to be readily broken or severed, to accomplish the removal of the sealing member from the license plate.

The invention hereinbefore described is susceptible to many uses, but all of which center around the idea of protecting the owner of a vehicle in his exclusive use thereof. It is quite a common procedure in many States to perfect the transfer of an automobile from a seller to a purchaser by the mere transfer of a slip of paper called an "Ownership certificate", and allowing the license plate of the seller to remain on the vehicle, and to thereafter become the license plate of the purchaser when the "Ownership certificate" is placed of record with the authorities having charge of motor vehicle license registrations. In many instances, a prompt recording of the certificate of ownership by the purchaser is not effected, and, as a result, any violations of the law occurring prior to said re-registration are charged against the prior owner of the vehicle. With my invention applied to the license plates of a vehicle, the owner of the vehicle would break the plate sealing mechanism upon divesting himself of possession of the vehicle, and the purchaser of the machine would not be able to operate the vehicle, providing the proper policing supervision notices that the vehicle is operating without the seal on the license plate.

My invention, in order to be effective, will require the police and other motor patrol authorities, to stop all cars from operating which are not provided with seals on the license plate. In the event the seal on the license plate should be accidentally broken, and the owner of the vehicle can satisfactorily explain, new seals can be issued to be applied in place of the broken seals, but a public record would be had of the entire proceeding. In the event the vehicle would be stolen and the thief apprehended, the arresting officers would break the seals on the license plate to prevent further operation of the vehicle, except where the owner thereof would, on becoming repossessed of the car, obtain new seals for the plates.

The seals could be serially numbered or made to contain any other data or indicia to coincide or check with the records of the authorities having charge of vehicle registrations. There are many other instances, which I have not mentioned, which would be of immense protective value to the owner of a motor vehicle having the license plates thereon protected by my sealing mechanism.

Having thus described this invention, what I claim and desire to secure by Letters Patent is:

1. A license plate holder including, in combination a bracket, a license plate, bolts to detachably hold the plate onto the bracket; and a member mounted on the plate having flanges thereon encasing the bolts to prevent removal thereof, unless said member be broken.

2. A license plate holder including, in combination, a bracket, a license plate, bolts to detachably hold the plate onto the bracket; a bar, having outstanding shoulders, clamped onto the outer face of the plate by the bolts; and a member having its opposite ends attached to the outstanding shoulders on the bar and covering the bolts to prevent removal thereof unless said member be broken.

3. A license plate holder including, in combination, a bracket, a license plate, bolts to detachably hold the plate onto the bracket; a bar, having outstanding shoulders, clamped onto the outer face of the plate by the bolts; and a strip having its opposite ends attached to the outstanding shoulders on the bar and covering the exposed ends of the bolts, said strip being unsupported between the bolts to effect breakage thereof.

4. A license plate holder including, in combination, a bracket, a license plate, bolts to detachably hold the plate onto the bracket; a bar, having outstanding shoulders, clamped onto the outer face of the plate by the bolts; and a member having its opposite ends attached to the outstanding shoulders on the bar and covering the bolts to prevent removal thereof unless said member be broken, one of said ends having permanent means thereon to engage one of the bar shoulders and the other end having detachable means thereon to engage the other bar shoulder.

5. A license plate holder including, in combination, a bracket, a license plate, bolts to detachably hold the plate onto the bracket; and a strip covering the exposed ends of the bolts on the outer surface of the plate, said strip being unsupported between its ends to effect breakage thereof, one of said ends having permanent means thereon to engage one of the bar shoulders and the other end having detachable means thereon to engage the other bar shoulder.

6. A license plate holder including, in combination, a bracket, a license plate, bolts to detachably hold the plate onto the bracket; a bar, having outstanding shoulders, clamped onto the outer face of the plate by the bolts; a member having its opposite ends attached to the outstanding shoulders on the bar and covering the bolts to prevent removal thereof unless said member be broken; and coengaging locking means on each of the opposite ends of the bar shoulders and the member to hold the member immovably on the bar shoulders.

WILLIAM S. SALISBURY.